(12) United States Patent
Chmiel

(10) Patent No.: US 6,226,167 B1
(45) Date of Patent: May 1, 2001

(54) PROVING SWITCH

(75) Inventor: Steven F. Chmiel, Cudahy, WI (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/377,119

(22) Filed: Aug. 19, 1999

(51) Int. Cl.[7] ............................................. F16D 27/02
(52) U.S. Cl. ........................... 361/160; 361/187; 361/154
(58) Field of Search ................................. 361/152–156, 361/160, 187

(56) References Cited

U.S. PATENT DOCUMENTS 4,567,975 * 2/1986 Roll ........................................ 361/154
4,620,261 * 10/1986 Thornton ............................... 361/154

* cited by examiner

Primary Examiner—Fritz Fleming
(74) Attorney, Agent, or Firm—Andrus, Sceales, Strake & Sawall, LLP

(57) ABSTRACT

A proving switch is provided for an electromagnetic device for brakes and clutches having an energization coil energizable to attract an armature to a magnet body, the coil exhibiting increasing current flow therethrough upon application of an energization voltage thereacross, and exhibiting a momentary dip upon engagement of the armature and magnet body. Detection circuitry senses the current dip and provides a status signal in response thereto, confirming the engagement.

22 Claims, 3 Drawing Sheets

PROVING SWITCH

BACKGROUND AND SUMMARY

The invention relates to electromagnetic brakes and clutches having an energization coil energizable to attract an armature to a magnet body for starting or stopping a rotating member, and more particularly to a detector sensing engagement of the armature and the magnet body.

Mechanical engagement sensors for electromagnetic brakes and clutches are known in the prior art. These sensors typically include a series of three mechanical switches arranged in a generally triangular pattern around an armature and sensing closing movement of the armature. Heavy duty switches are required, to withstand the closing action of the armature, which robust construction increases cost. Furthermore, a machining operation is typically required to afford the necessary precise mounting location of the switches, further increasing cost. Alignment must also be precisely controlled so that all three switches close simultaneously. The tolerances are quite narrow and unforgiving because even a small magnetic gap substantially increases magnetic reluctance.

Another approach in the prior art is the use of an inductive proximity switch sensing closing movement of the armature. The above noted limitations also apply to such switches.

The present invention provides electronic detection circuitry, eliminating reliance upon prior mechanical or proximity switches. The present invention provides a significantly lower cost alternative to the prior art. In the present invention, the detector, or proving switch, may be located remotely from the brake or clutch, with no additional wiring to the brake or clutch being required. The invention may be used with a wide variety of power transmission devices, with no need for tuning to the specific power transmission device as in the prior art, e.g. machining, etc. A further advantage of the present invention not obtainable in the prior art is use with power transmission devices too small in physical size to use the above described approaches involving mechanical or proximity switches.

DETAILED DESCRIPTION

First Generation

Figure 1:
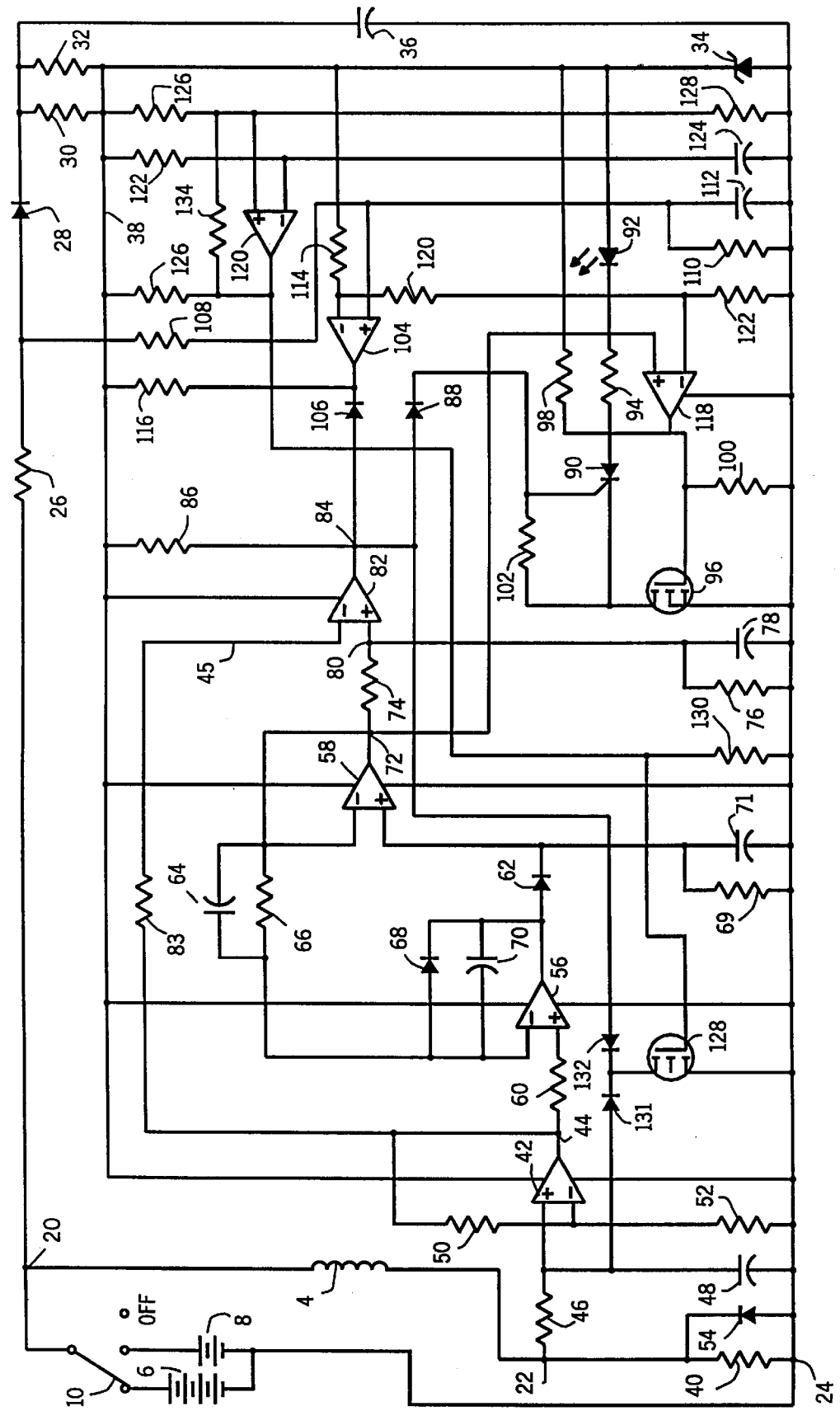
FIG. 1 is a circuit diagram of a first generation development of detection circuitry in accordance with the invention.
Figure 2:
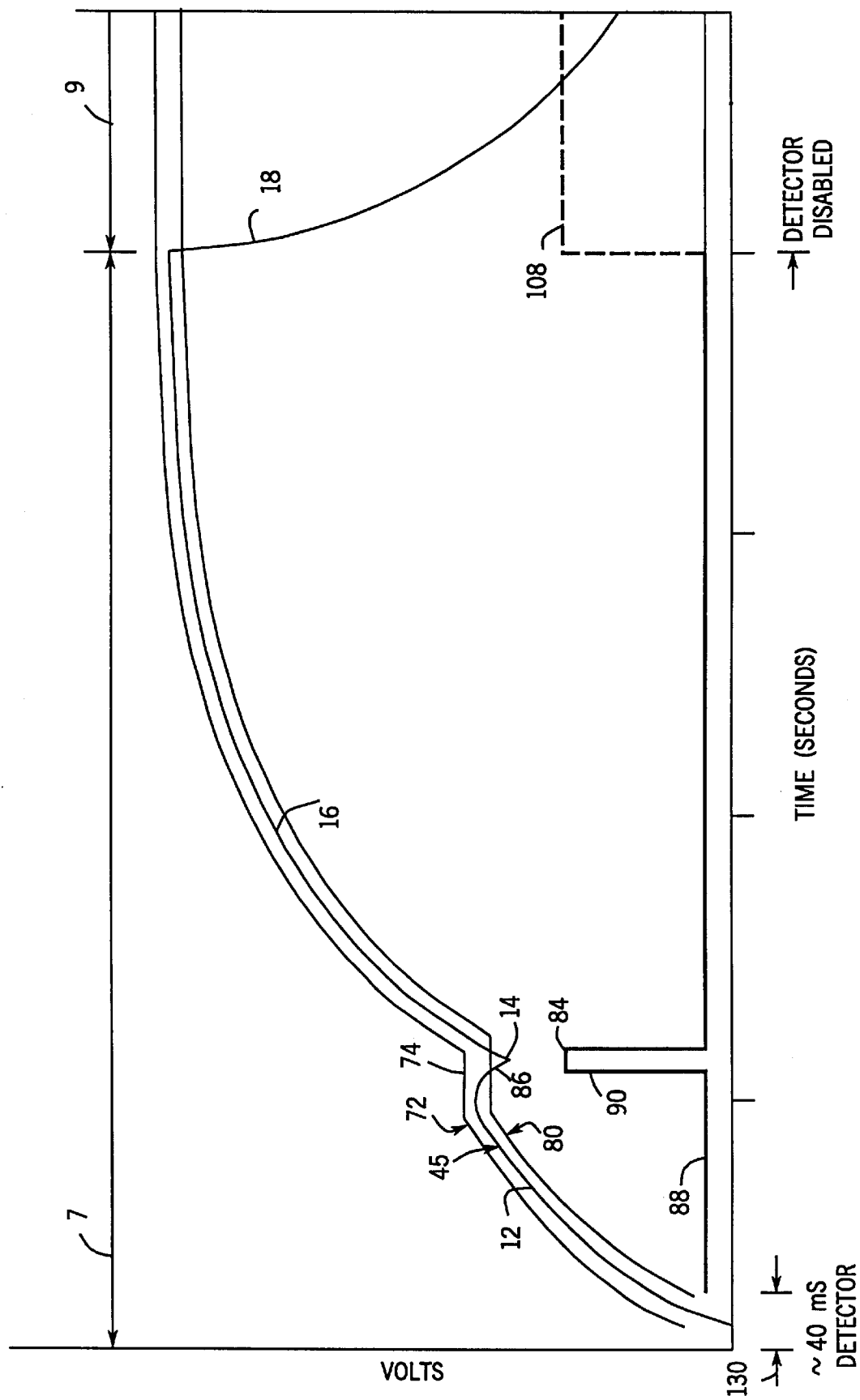
FIG. 2 is a waveform diagram illustrating operation of the circuitry of FIG. 1.

FIG. 1 shows detection circuitry for a DC electromagnetic clutch having an energization coil 4. FIG. 2 shows typical detection circuitry waveforms and timing intervals. The particular embodiment shown is a mill clutch engagement sensor wherein a first forcing or overexcitation voltage, such as 270 volts DC, from source 6 is applied across coil 4 during a first forcing or overexcitation interval 7, such as four seconds, and then a second lower holding voltage, such as 70 volts DC, from source 8 is applied across coil 4 during a second holding interval 9, following first interval 7, i.e. after four seconds, by moving switch 10 from its leftward position to its central position, which is typically done automatically by a timer (not shown). Upon application of energization voltage across coil 4 during the first interval 7, the coil exhibits increasing current flow therethrough, as shown at 12 in FIG. 2. The current momentarily decreases at dip 14 upon clutch engagement, i.e. when the armature engages the stator to close the magnetic gap therebetween due to the magnetic force induced by energization of coil 4. After dip 14, the current flow through coil 4 again increases as shown at 16, all during the noted first interval 7. At the beginning of the second interval 9, i.e. when the applied voltage is reduced from 270 volts to 70 volts, current flow through the coil decreases as shown at 18. This is because a lesser holding current is required to maintain the clutch in its engaged position. The present invention provides detection circuitry sensing current dip 14 and providing a status signal in response thereto, confirming clutch engagement.

The detection circuitry includes a first terminal 20 connected to the positive lead of the power source and to one terminal of the clutch coil 4, a second terminal 22 connected to the other terminal of coil 4, and a third terminal 24 connected to the negative lead of the power source. A power supply circuit is connected between leads 20 and 24 and includes resistor 26, diode 28, resistors 30 and 32, Zener diode 34, and capacitor 36. In this particular embodiment, the power supply is chosen to provide 20 volts DC on line 38 for operation of the detection circuitry. Diode 28 prevents discharge of filter capacitor 36 through clutch coil 4. Resistors 30 and 32 provide current limiting for Zener diode 34. Resistor 26 is a metal oxide film resistor selected to open in the event of failure of capacitor 36.

Resistor 40 between terminals 22 and 24 is a current sensing resistor connected in series with clutch coil 4. A voltage is developed across resistor 40 proportional to clutch coil current. The current sensor also includes an operational amplifier 42 outputting a voltage signal 44 tracking the noted current flow. Resistor 46 and capacitor 48 provide filtering of electrical noise. Resistors 50 and 52 set the gain of amplifier 42. Diode 54 protects amplifier 42 in the event of reverse polarity connection of terminals 20 and 24.

Amplifiers 56 and 58 are configured as a peak track and hold circuit, which is known in the prior art. The output of amplifier 42 is supplied through resistor 60 to the noninverting input of amplifier 56, whose output is supplied through diode 62 to the noninverting input of amplifier 58. The output of amplifier 58 is fed back to its inverting input and is also fed back through the parallel combination of capacitor 64 and resistor 66 to the inverting input of amplifier 56, which input is connected to the output of amplifier 56 through the parallel combination of diode 68 and capacitor 70, all as is standard. Capacitor 71 provides the holding function. Resistor 69 provides a discharge path for capacitor 71 upon turn-off of the circuit. The peak follower and hold circuit responds to signal 44 and outputs a voltage signal 72 tracking signal 44 and holding the peak value thereof. For example, signal 72 does not decrease when signal 44 decreases at current dip 14, but rather maintains its level as shown at 74, FIG. 2.

Tracking signal 72 is scaled down by a level shifter provided by resistor 74, resistor 76, and capacitor 78 shifting the level of signal 72 to provide a lower level signal 80, FIG. 2, supplied to the noninverting input of comparator 82. Tracking signal 44 is supplied through resistor 83 to provide tracking signal 45 to the inverting input of comparator 82. Comparator 82 compares signals 45 and 80 and outputs a status signal 84 when the value of signal 45 drops below the value of signal 80, as shown at 86 due to current dip 14. The voltages are scaled such that the dynamically changing output tracking signal 45 from amplifier 42 is slightly greater in magnitude than output 80, except at current dip 14. The value of signal 45 is normally greater than the value of signal 80, and hence the inverting input of comparator 82 is higher than the noninverting input, and hence the output of comparator 82 is normally low, as shown at 88, FIG. 2. When the value of signal 45 drops below the value of signal 80, the inverting input of comparator 82 becomes less than the noninverting input, and hence the output of comparator 82 transitions high as shown at transition 90, FIG. 2.

The high state of signal 84 at the output of comparator 82 enables voltage to be applied from the power supply circuit on line 38 through resistor 86 and diode 88 to the gate of SCR, silicon controlled rectifier, 90 to trigger the latter into conduction to conduct current through light emitting diode 92 and resistor 94. The light from LED 92 may be coupled to an optotriac driver or the like to in turn trigger another circuit function, or may be used to provide a visual indication of status signal 84, confirming clutch engagement. This output circuit is completed through FET, field effect transistor, 96 which is normally on, to be described, as biased into conduction by the voltage provided through resistor 98. Resistor 100 desensitizes the gate of FET 96 to minimize nuisance tripping. Resistor 102 desensitizes the gate of SCR 90 to minimize nuisance tripping.

An interval sensor is provided by comparator 104 comparing the voltage across coil 4 against a reference voltage, and having an output connected through diode 106 to the output of comparator 82. The voltage across coil 4 is sensed at the noninverting input of comparator 104 through the voltage divider provided by resistors 108 and 110 and filtering capacitor 112. A reference voltage is sensed at the inverting input of comparator 104 through the voltage divider provided by resistors 114,120 and 122, derived from the 20 volt DC power supply circuit. During the first interval 7, FIG. 2, i.e. during the first four seconds when 270 volts DC is applied across coil 4, the noninverting input of comparator 104 is higher than the inverting input, and the output of comparator 104 is high, through pull-up resistor 116. At the beginning of the second interval 9, i.e. upon application of the reduced 70 volts DC across coil 4 as shown at 18, the voltage level at the noninverting input of comparator 104 drops below that at the inverting input, whereupon the output of comparator 104 transitions low, which low state pulls the output of comparator 82 at signal 84 low through diode 106. Without comparator 104, signal 84 would transition high at the beginning of the second interval, as shown at dashed line 108, FIG. 2. The interval sensor provided by comparator 104 enables status signal 84 during the first interval 7, and disables the status signal during the second interval 9. Diode 106 blocks current flow therethrough from the output of comparator 104 to the output of comparator 82 to enable the status signal when the output of comparator 104 is high. Diode 106 passes current flow therethrough from the output of comparator 82 to the output of comparator 104 when the latter is low, to disable the status signal.

An activity sensor is provided by comparator 118 sensing the absence of current in coil 4 and disabling the output circuit 90, 92. The noninverting input of comparator 118 is connected to the output of peak track and hold circuit 56, 58 to receive signal 72. The inverting input of comparator 118 is supplied with a reference voltage through the voltage divider provided by resistors 114 and 120 and resistor 122. The noninverting input of comparator 118 is normally greater than the inverting input, and the output of comparator 118 is normally high, which enables FET 96 to be gated into conduction through resistor 98, to complete the output circuit through LED 92 and SCR 90. If there is an absence of current through coil 4, then signal 72 is absent, and the noninverting input of comparator 118 drops below the inverting input, and the output of comparator 118 goes low, turning off FET 96, to interrupt the output circuit.

An initialization circuit is provided by comparator 120 and the RC timing circuit provided by resistor 122 and capacitor 124. The noninverting input of comparator 120 receives a reference voltage from the voltage divider provided by resistors 126 and 128. At initial start-up at the beginning of the first interval 7 as shown at 130, FIG. 2, the inverting input of comparator 120 is lower than the noninverting input, until capacitor 124 charges to a voltage matching that at the noninverting input. In the disclosed embodiment, this charging time is chosen to be about 40 milliseconds, i.e. the length of the initialization interval 130 is chosen to be about 40 milliseconds. This allows power switching transients to settle down. During this initialization interval, the output of comparator 120 is high, through pull-up resistor 126. This high state enables FET 128 to be gated into conduction by the voltage applied through resistor 126. Resistor 130 desensitizes the gate of FET 128 to minimize nuisance tripping. The drain terminal of FET 128 is connected through diode 131 to the current sensor at the noninverting input of amplifier 42, and is connected through diode 132 to the output of comparator 82. Conduction of FET 128 pulls the noninverting input of amplifier 42 and the output of comparator 82 low, disabling the status signal. When capacitor 124 charges to the voltage level at the noninverting input of comparator 120, the output of comparator 120 transitions low, turning off FET 128, and enabling circuit operation as above described. Resistor 134 provides hysteresis, to prevent retriggering of FET 128.

Second Generation

Figure 3:
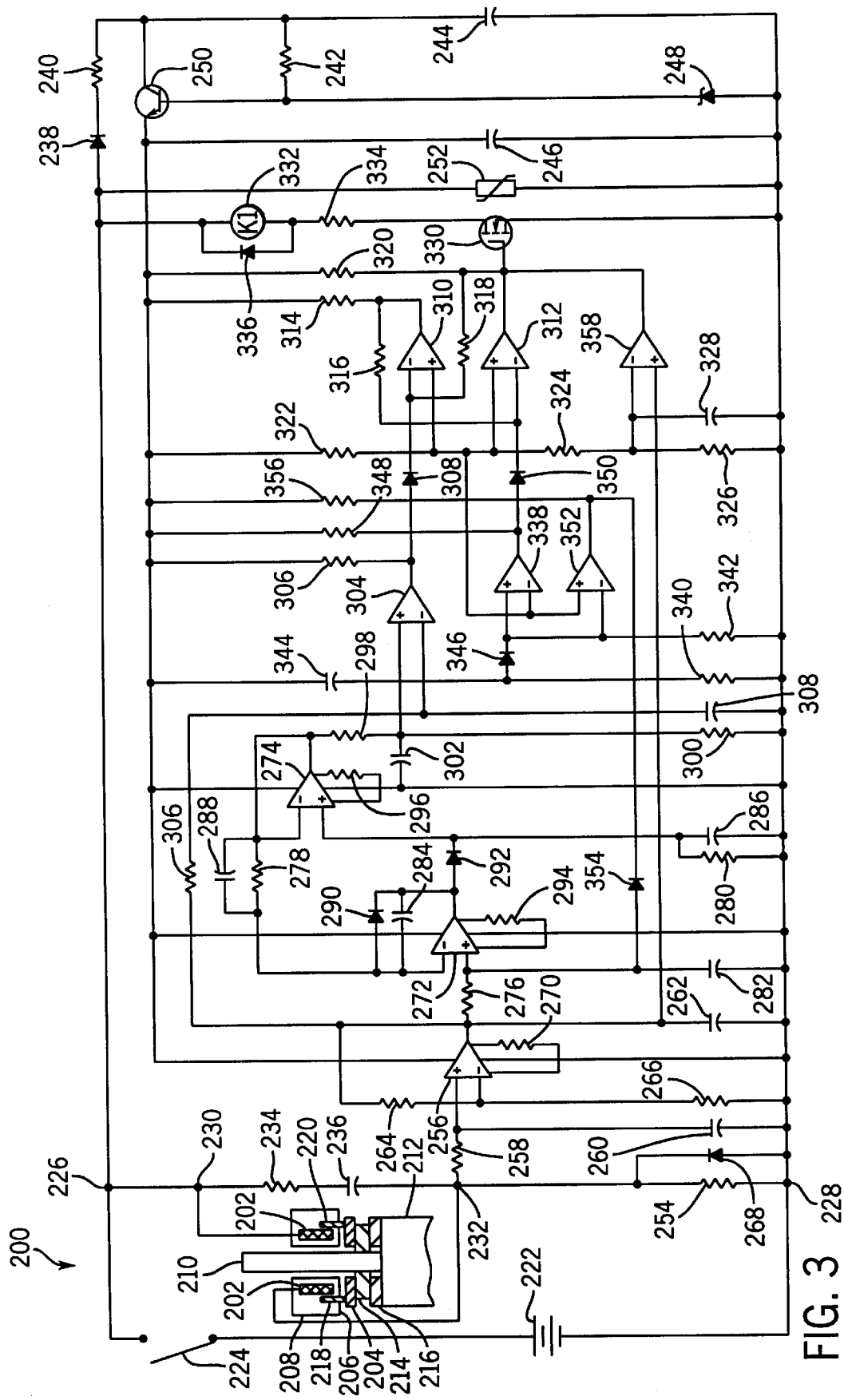
FIG. 3 is a circuit diagram of a second generation development of detection circuitry in accordance with the invention.

FIG. 3 shows an electromagnetic device 200 for brakes and clutches having an energization coil 202 energizable to attract an armature 204 to a pole face 206 of a magnet body 208. FIG. 3 schematically shows an electromagnetic brake wherein the brake coil 202 is energizable to actuate the brake to a released condition permitting rotation of rotary output shaft 210 of electric motor 212, and deenergizable to enable actuation of the brake to a braking condition stopping rotation of motor shaft 210. The brake is normally in a set or braking condition stopping rotation of the motor. A friction disk 214 is keyed to and rotates with shaft 210. The friction disk is normally pushed by axially movable armature 204 against a stationary pressure plate 216 which is mounted on the end face of motor 212. Armature 204 is pushed against friction disk 214 by biasing springs 218, 220. The brake is actuated to a released condition, permitting rotation of the electric motor, by energizing brake coil 202, which in turn creates a magnetic flux field pulling armature 204 toward and against pole face 206 of magnet body 208, against the bias of springs 218, 220. This releases friction disk 214 from engagement with pressure plate 216, to in turn enable rotation of friction disk 214 and motor shaft 210. The above-described structure and operation is known in the prior art, and hence is only schematically shown.

The circuitry of FIG. 3 is connected across a DC power source 222 through a user actuated switch 224. The proving switch detection circuitry of FIG. 3 is connected to the power source at positive terminal 226 and at negative terminal 228, and is connected to coil 202 at terminals 230 and 232. Resistor 234 and capacitor 236 are connected across coil terminals 230 and 232 and provide a transient suppression network. Rectifier diode 238, resistors 240, 242, capacitors 244, 246, Zener diode 248, and transistor 250 provide a regulated power supply for operation of the detection circuitry, preferably a 20 volt DC power supply for the circuitry, to be described, from a 205 volt DC power source 222. Diode 238 prevents discharge of filter capacitor 244 through the brake or clutch coil 202. Resistor 242 provides current limiting for Zener diode 248 and base drive current for regulator transistor 250. Resistor 240 is a metal oxide film resistor selected to open in the event of failure of capacitor 244 and/or transistor 250. Metal oxide varistor, MOV, 252 provides transient overvoltage protection.

Resistor 254 is a current sensing resistor connected in series with brake or clutch coil 202. A voltage is developed across resistor 254 which is proportional to the current through coil 202. When brake or clutch coil 202 is energized, the magnetic field attracts armature 204 to pole face 206 of magnet body 208. When armature 204 makes physical contact with magnet body 208 at pole face 206, a change of slope of the coil current is observed, as shown at 86, FIG. 2. Proving switch 200 detects this change of slope, and provides an engagement signal, such as an "engaged" or "accept" status signal, by relay actuation, to be described. If armature 204 fails to make physical contact with pole face 206 of magnet body 208, or makes contact in an undesirable manner, the desired change of slope 86 at dip 14 will not be observed. The output relay of the providing switch will remain in an idle state, to be described, indicating "not engaged" or "not acceptable" status.

Operational amplifier 256 is configured as a noninverting amplifier which in one embodiment has a gain of ten. The amplification by a factor of ten allows detection of the current slope information without excessive dissipation of resistor 254. Resistor 258 and capacitors 260, 262 provide filtering of undesirable electrical noise. Resistors 264 and 266 set the gain of amplifier 256. Diode 268 protects the input of amplifier 256 from application of reverse voltage. Resistor 270 sets the amplifier offset voltage. The described circuitry provides detection circuitry sensing the noted change of slope 86 and current dip 14 and provides a status signal, to be described, in response thereto confirming the noted engagement of armature 204 and pole face 206 of magnet body 208. The described current sensor senses the current flow through coil 202 and outputs a signal at the output of amplifier 256 corresponding thereto.

Operational amplifiers 272 and 274 are configured as a unity gain peak track and hold amplifier. The associated circuit components are resistors 276, 278, 280, capacitors 282, 284, 286, 288, and diodes 290, 292. Resistors 294, 296 set the amplifier offset voltage. The output of amplifier 256 is fed into the peak track and hold circuit provided by amplifiers 272 and 274, the output of which is scaled, i.e. level shifted, by the network of resistors 298, 300, and filtered by capacitor 302. This scaled, level shifted, voltage is input as a reference voltage to the noninverting input of comparator 304. The inverting input of comparator 304 is connected to the output of amplifier 256 via resistor 306, filtered by capacitor 308. Upon application of power from source 222 to coil 202 by closure of switch 224, a voltage is developed across resistor 254 proportional to the current through brake or clutch coil 202. This voltage, amplified by amplifier 256, is compared to the scaled and filtered reference voltage provided by the peak track and hold circuit provided by amplifiers 272 and 274. The voltages are scaled, i.e. level shifted, such that the dynamically changing output voltage of amplifier 256 is slightly greater in magnitude than the output of the peak track and hold circuit provided by amplifiers 272 and 274. Thus, the output of comparator 304 is low.

When the brake or clutch engages, i.e. armature 204 physically engages pole face 206 of magnet body 208, a negative change of slope of the coil current is observed, 86, FIG. 2. At this instant, the dynamically changing output of amplifier 256, connected through resistor 306 to the inverting input of comparator 304, becomes less positive than the reference voltage at the noninverting input of comparator amplifier 304 provided by the output of peak track and hold amplifier 272, 274 through resistor 298. Thus, the output of amplifier 304 transitions high, via pull-up resistor 306.

The output of comparator amplifier 304 is coupled via signal diode 308 to a hard-wired flip-flop circuit provided by comparators 310 and 312, and resistors 314, 316, 318, 320. The flip-flop reference voltage, provided at the noninverting input pin of amplifier 310 and the noninverting input pin of amplifier 312, is provided by the network of resistors 322, 324, 326, and capacitor 328. A high signal from the output of amplifier/comparator 304 through diode 308 to the inverting input of amplifier 310 causes the output of amplifier 310 to transition low, which in turn through resistor 316 draws the inverting input of amplifier 312 low, which in turn causes the output of amplifier 312 to transition high, which gates MOSFET 330 into conduction, which in turn actuates relay 332, i.e. pulls in the relay, to an "engaged" or "acceptable" status indication of the proving switch. Resistor 334 is connected in series with the relay coil to serve a voltage dropping function, which in preferred form allows the use of a standard 110 volt DC relay 332 in an application of a 205 volt DC power source 222. Diode 336 suppresses the turn-off transient generated by the coil of relay 332. The above-described detection circuitry senses current dip 14, FIG. 2, and provides a status signal at the output of comparator/amplifier 304 and at the output of amplifier 310 and at the output of amplifier 312 in response thereto, confirming engagement of armature 204 and pole face 206 of magnet body 208.

Comparator 338 is configured as a noninverting set timer. The function of this timer is to set the proving switch in the proper logic state upon application of power. Resistors 322, 324, 326, and capacitor 328 establish a reference level at the inverting input of comparator 338. Resistors 340 and 342 and capacitor 344 provide a timing function coupled through diode 346 to the noninverting input of comparator 338. Until such time that the voltage across resistor 340 decreases to less than the reference level at the inverting input, the output of comparator 338 is high, due to pull-up resistor 348. This high signal is coupled through diode 350 to the inverting input of comparator 312, causing the output of comparator 312 to be held low for the duration of the set timer, ensuring that relay 332 remains de-energized in the power-up interval. This interval is preferably about 10 milliseconds, as set by the noted timing circuit including capacitor 344 and resistors 340 and 342. Thus, for the first 10 milliseconds after application of power, i.e. after closure of switch 224, the proving switch output relay 332 is disabled. This allows switching transients to settle down after application of power, and ensures proper functioning of the circuitry. After the 10 millisecond set interval, the voltage across resistor 340 decreases due to reduced current feed thereto through capacitor 344 due to saturation of the latter, and the voltage at the noninverting input of comparator 338 becomes less than the voltage at the inverting input of comparator of 338, and the output of comparator 338 transitions low, disabling the set function, and allowing proving switch response according to acquisition of engagement information. The initialization circuitry described thus disables the output circuit upon initial application of energization voltage.

Comparator 352 is configured as an inverting 10 millisecond blanking interval timer. The function of this timer is to provide a blanking interval immediately after application of power, which prevents the proving switch detection circuitry from tracking or holding a transient voltage which may exist upon application of power. Resistors 322, 324 and 326 and capacitor 328 establish a reference level at the noninverting input of comparator 352. Resistors 340 and 342 and capacitor 344 provide the timing function coupled to the inverting input of comparator 352 through signal diode 346. Until such time that the voltage across resistor 340 decreases to less than the reference level at the noninverting input of comparator 352, the output of comparator 352 is low. The noninverting input of track and hold amplifier 272 is pulled low through signal diode 354 connected to the output of comparator 352, and remains low for the duration of the blanking interval. Thus, for the first 10 milliseconds after application of power, i.e. after closure of switch 224, the detection circuitry is disabled. This allows switching transients to settle down after application of power, and ensure proper functioning of the proving switch circuitry. After the 10 millisecond blanking interval, the voltage across resistor 340 decreases due to reduced current feed thereto through capacitor 344 due to saturation of the latter, and the voltage at the noninverting input of comparator 352 becomes less than the voltage at the inverting input of comparator 352, and the output of comparator 352 transitions high due to pull-up resistor 356, disabling the blanking function, and allowing acquisition of engagement information. The blanking interval timer thus disables the peak track and hold circuit from tracking the signal output by the current sensing circuitry through resistor 276 for a given interval upon initial application of energization voltage.

Comparator 358 detects the total absence of brake or clutch coil current information, and disables the proving switch. Comparator 358 performs this function by comparing the output of amplifier 256 at its noninverting input with a reference voltage derived from the 20 volt power supply at its inverting input. If the output of amplifier 256 at the noninverting input of comparator 358 is less than the reference voltage at the inverting input of comparator 358, the output of comparator 358 transitions low, via resistor 320, disabling MOSFET 330 which disables the proving switch relay 332. If the output of amplifier 256 is within normal operating parameters, then the signal at the noninverting input of comparator 358 is higher than the reference voltage at the inverting input of comparator 358, and the output of comparator 358 transitions high via resistor 320. Gating of MOSFET 330 is then controlled entirely by the output of comparator 312, as above described. This circuitry thus provides an activity center sensing the absence of current in coil 202 and disables the output circuit.

It is recognized that various equivalents, alternatives and modifications are possible within the scope of the appended claims. The invention is applicable to various types of electromagnetic devices for brakes and clutches having an energization coil energizable to attract an armature to a magnet body, including DC electromagnetic brakes and clutches for starting, stopping or controlling the transmission of rotary power.

What is claimed is:

1. In an electromagnetic device for brakes and clutches having an energization coil energizable to attract an armature to a magnet body, said coil exhibiting increasing current flow therethrough upon application of an energization voltage thereacross, and exhibiting a momentary dip upon engagement of said armature and said magnet body, detection circuitry sensing said current dip and providing a status signal in response thereto confirming said engagement, a current sensor sensing the current flow through said coil and outputting a first signal corresponding thereto, a peak track and hold circuit responsive to said current sensor and outputting a second signal tracking said first signal and holding the peak value thereof, a level shifter shifting the level of at least one of said first and second signals to provide a third signal, a comparator comparing said third signal and the other of said first and second signals and outputting said status signal upon a given transition of said other signal relative to said third signal.

2. The invention according to claim 1 wherein said level shifter shifts the level of said second signal to provide said third signal, said comparator compares said first and third signals and outputs said status signal in response to the first signal value dropping below the third signal value.

3. The invention according to claim 1 comprising an output circuit responsive to said status signal, and an initialization circuit disabling said output circuit upon initial application of said energization voltage.

4. The invention according to claim 3 wherein said initialization circuit comprises a set timer disabling said output circuit for a given interval upon said initial application of said energization voltage.

5. The invention according to claim 3 wherein said initialization circuit comprises a blanking interval timer disabling said peak track and hold circuit from tracking said first signal output by said current sensor for a given interval upon said initial application of said energization voltage.

6. The invention according to claim 3 wherein said initialization circuit comprises:
 a set timer disabling said output circuit for a first given interval upon said initial application of said energization voltage; and
 a blanking interval timer disabling said peak track and hold circuit from tracking said first signal output by said current sensor for a second given interval upon said initial application of said energization voltage.

7. The invention according to claim 6 wherein said first given interval equals said second given interval.

8. In an electromagnetic device for brakes and clutches having an energization coil energizable to attract an armature to a magnet body, said coil exhibiting increasing current flow therethrough upon application of an energization voltage thereacross, and exhibiting a momentary dip upon engagement of said armature and said magnet body, detection circuitry sensing said current dip and providing a status signal in response thereto confining said engagement, an output circuit responsive to said status signal, and an activity sensor sensing the absence of current in said coil and disabling said output circuit.

9. In an electromagnetic device for brakes and clutches having an energization coil energizable to attract an armature to a magnet body, said coil exhibiting increasing current flow therethrough upon application of an energization voltage thereacross, and exhibiting a momentary dip upon engagement of said armature and said magnet body, detection circuitry sensing said current dip and providing a status signal in response thereto confirming said engagement, an output circuit having an input and an output, said input being responsive to said status signal, said output driving an output switch, and comprising a first disabling circuit connected to said input and a second disabling circuit connected to said output, each disabling circuit responsive to a given respective parameter and disabling said output circuit.

10. The invention according to claim 9 wherein one of said disabling circuits is a set timer connected to one of said input and said output and disabling said output circuit for a given interval upon said initial application of said energization voltage, and wherein the other of said disabling circuits is an activity sensor connected to the other of said input and said output and sensing the absence of current in said coil and disabling said output circuit.

11. The invention according to claim 9 wherein said output circuit comprises a flip flop having a first flip flop component with an input from said status signal, and a second flip flop component with an input from the output of said first flip flop component and an output to said output switch, said first disabling circuit being connected to said input of said second flip flop component, said second disabling circuit being connected to said output of said second flip flop component.

12. In an electromagnetic device for brakes and clutches having an energization coil energizable to attract an armature to a magnet body, said coil exhibiting increasing current flow therethrough upon application of an energization voltage thereacross, and exhibiting a momentary current dip upon engagement of said armature and said magnet body, detection circuitry sensing said current dip and providing a status signal in response thereto confirming said engagement, comprising a current sensor sensing the current flow through said coil and outputting a first signal corresponding thereto, a peak track and hold circuit responsive to said current sensor and outputting a second signal tracking and holding the peak value thereof, a level shifter shifting the level of one of said first and said second signals to provide a third signal, a comparator comparing said third signal and the other of said first and second signals and outputting said status signal in response to a given transition of said other signal value relative to said third signal value, an output circuit responsive to said status signal, and an initialization circuit disabling said output circuit upon initial application of said energization voltage.

13. The invention according to claim 12 wherein said initialization circuit comprises a set timer disabling said output circuit for a first given interval upon said initial application of said energization voltage, and a blanking interval timer disabling said peak track and hold circuit from tracking said first signal output by said current sensor for a second given interval upon said initial application of said energization voltage, and comprising an activity sensor sensing the absence of current in said coil and disabling said output circuit.

14. In a DC electromagnetic clutch having an energization coil exhibiting increasing current flow therethrough upon application of an energization voltage thereacross and exhibiting a momentary current dip upon clutch engagement detection circuitry sensing said current dip and providing a status signal in response thereto confirming said clutch engagements, a current sensor sensing the current flow through said coil and outputting a first signal tracking said current flow, a peak track and hold circuit responsive to said current sensor and outputting a second signal tracking said current flow and holding the peak value thereof, a level shifter shifting the level of at least one of said first and second signals to provide a third signal, a comparator comparing said third signal and the other of said first and second signals and outputting said status signal upon a given transition of said other signal relative to said third signal.

15. The invention according to claim 14 wherein said level shifter shifts the level of said second signal to provide said third signal, said comparator compares said first and third signals and outputs said status signal in response to the first signal value dropping below the third signal value.

16. In a DC electromagnetic clutch having an energization coil exhibiting increasing current flow therethrough upon application of an energization voltage thereacross and exhibiting a momentary current dip upon clutch engagement, detection circuitry sensing said current dip and providing a status signal in response thereto confirming said clutch engagement, wherein a first energization voltage is applied across said coil during a first interval, and a second lower energization voltage is applied across said coil during a second interval following said first interval, and wherein current flow through said coil initially increases, and then momentarily decreases at said current dip upon clutch engagement, and then increases again, all during said first interval, and then decreases again at the beginning of said second interval, and comprising an interval sensor enabling said status signal during said first interval and disabling said status signal during said second interval.

17. The invention according to claim 16 comprising a current sensor sensing the current flow through said coil and outputting a first signal tracking said current flow, a peak track and hold circuit responsive to said current sensor and outputting a second signal tracking said current flow and holding the peak value thereof, a level shifter shifting the level of at least one of said first and second signals to provide a third signal, a first comparator comparing said third signal and the other of said first and second signals and outputting said status signal upon a given transition of said other signal relative to said third signal, and wherein said interval sensor comprises a second comparator comparing the voltage across said coil against a reference voltage and having an output connected through a diode to the output of said first comparator, said diode blocking current flow therethrough from the output of said second comparator to the output of said first comparator to enable said status signal, said diode passing current flow therethrough from the output of said first comparator to the output of said second comparator to disable said status signal.

18. In a DC electromagnetic clutch having an energization coil exhibiting increasing current flow therethrough upon application of an energization voltage thereacross and exhibiting a momentary current dip upon clutch engagement, detection circuit sensing said current dip and providing a status signal in response thereto confining said clutch engagement, an output circuit responsive to said status signal, and an activity sensor sensing the absence of current in said coil and disabling said output circuit.

19. The invention according to claim 18 comprising a current sensor sensing the current flow through said coil and outputting a first signal tracking said current flow, a peak track and hold circuit responsive to said current sensor and outputting a second signal tracking said current flow and holding the peak value thereof, a level shifter shifting the level of at least one of said first and second signals to provide a third signal, a first comparator comparing said third signal and the other of said first and second signals and outputting said status signal upon a given transition of said other signal relative to said third signal, and wherein said activity sensor comprises a second comparator comparing one of said first and second signals against a reference and having an output connected to said output circuit.

20. The invention according to claim 19 wherein said output circuit comprises a first semiconductor switch having a gate connected to the output of said first comparator, a second semiconductor switch connected in series with said first semiconductor switch and having a gate connected to the output of said second comparator.

21. In a DC electromagnetic clutch having an energization coil exhibiting increasing current flow therethrough upon application of an energization voltage thereacross and exhibiting a momentary current dip upon clutch engagement, detection circuitry sensing said current dip and providing a status signal in response thereto confirming said clutch engagement, an initialization circuit disabling said status signal upon initial application of said energization voltage, a current sensor sensing the current flow through said coil and outputting a first signal tracking said current flow, a peak track and hold circuit responsive to said current sensor and outputting a second signal tracking said current flow and holding the peak value thereof, a level shifter shifting the level of at least one of said first and second signals to provide a third signal, a comparator comparing said third signal and the other of said first and second signals and outputting said status signal upon a given transition of said other signal relative to said third signal, and wherein said initialization circuit comprises a timer providing an initialization interval during which said status signal is disabled, a semiconductor switch having a gate terminal connected to said timer and a main terminal connected to said current sensor and to the output of said comparator.

22. In a DC electromagnetic clutch having an energization coil exhibiting increasing current flow therethrough upon application of an energization voltage thereacross and exhibiting a momentary current dip upon clutch engagement, detection circuitry sensing said current dip and providing a status signal in response thereto confirming said clutch engagement, a current sensor sensing the current flow through said coil and outputting a first signal tracking said current flow, a peak track and hold circuit responsive to said current sensor and outputting a second signal tracking said current flow and holding the peak value thereof, a level shifter shifting the level of at least one of said first and second signals to provide a third signal, a first comparator comparing said third signal and the other of said first and second signals and outputting said status signal upon a given transition of said other signal relative to said third signal, wherein a first energization voltage is applied across said coil during a first interval, and a second lower energization voltage is applied across said coil during a second interval following said first interval, and wherein current flow through said coil initially increases, and then momentarily decreases at said current dip upon clutch engagement, and then increases again, all during said first interval, and then decreases again at the beginning of said second interval, and comprising an interval sensor enabling said status signal during said first interval and disabling said status signal during said second interval, aid interval sensor comprises a second comparator comparing the voltage across said coil against a reference voltage and having an output connected through a diode to the output of said first comparator, said diode blocking current flow therethrough from the output of said second comparator to the output of said first comparator to enable said status signal, said diode passing current flow therethrough from the output of said first comparator to the output of said second comparator to disable said status signal, an output circuit responsive to said status signal, and activity sensor sensing the absence of current in said coil and disabling said output circuit, said activity sensor comprising a third comparator comparing one of said first and second signals against a reference and having an output connected to said output circuit.

* * * * *